C. F. LOCHNER,

Assignor, by mesne assignments, to F. STERNE.

SPARK ARRESTER.

No. 10,093. Reissued Apr. 25, 1882.

Attest.
John W. Layman.
John Becker.

Inventor.
Casper F. Lochner
by James H. Layman
Attorney.

N. PETERS, Photo-Lithographer, Washington, D. C.

UNITED STATES PATENT OFFICE.

CASPER F. LOCHNER, OF JEFFERSON, ASSIGNOR, BY MESNE ASSIGNMENTS, TO FRANK STERNE, OF HOUSTON, TEXAS.

SPARK-ARRESTER.

SPECIFICATION forming part of Reissued Letters Patent No. 10,093, dated April 25, 1882.

Original No. 217,542, dated July 15, 1879. Application for reissue filed February 8, 1882.

*To all whom it may concern:*

Be it known that I, CASPER F. LOCHNER, of Jefferson, Marion county, Texas, have invented certain new and useful Improvements in Spark-Arresters, of which the following is a specification.

The object of my invention is to provide a simple and effective device capable of arresting sparks and returning them to the smoke-arch of a locomotive-chimney, and without in the least interfering with the free and unobstructed escape of smoke. This result is accomplished by fitting within the chimney a series of flanges or wings that curve outwardly from a common center toward the shell of the stack or chimney, a deflecting-plate being located above these curved wings or flanges for the purpose of preventing the smoke taking a direct central passage through the chimney, as hereinafter more fully described.

Figure 1:
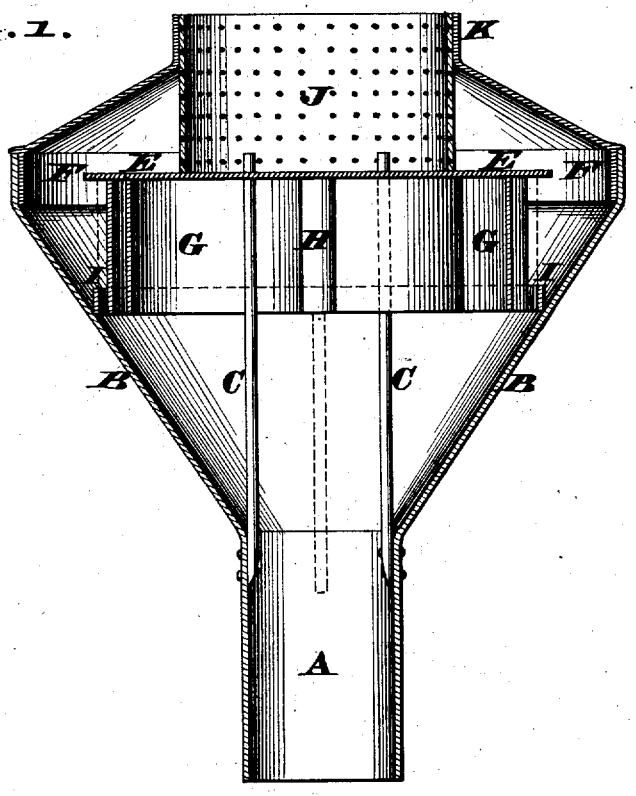
Figure 2:
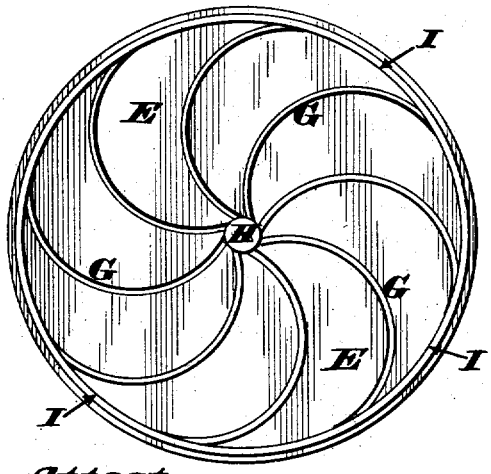
Figure 3:
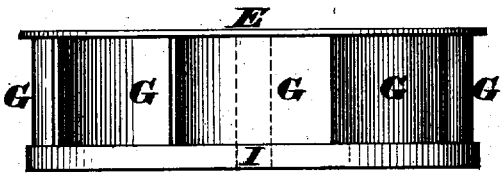

In the annexed drawings, Figure 1 is an axial section of my improved spark-arrester. Fig. 2 is a plan of the curved wings and deflecting-plate detached from the smoke-stack. Fig. 3 is a side elevation of said wings and plate.

A represents the base, and B the customary flaring portion of an ordinary locomotive chimney or smoke-stack. Secured to the base A are standards C, that support a deflecting-plate, E, of somewhat less diameter than the chimney, so as to afford an annular passage, F, for the escape of smoke and the other gaseous products of combustion. Arranged under this deflecting-plate are the curved wings or flanges G, radiating or proceeding from a common center in line with the axis of the smoke-stack, the shape of said wings being more clearly shown in Fig. 2. The lower margins of said wings are attached to a hoop, I, which hoop or ring is of the same diameter as that portion of the chimney with which it is in contact. Located above the plate E is a perforated cylinder, J, secured within the mouth or ventage K of the smoke-stack.

The operation of the above-described arrangement of devices is as follows: When the products of combuston are driven upwardly through the chimney A by the blast of the engine the sparks are arrested by the plate E, which deflects them laterally and prevents them escaping directly from the stack. This lateral deflection of the sparks causes them to traverse the various spaces or chambers between the curved flanges or wings G, by which means a whirling motion is imparted to said sparks. This whirling motion throws them outwardly against the shell B, from whence they fall back into the smoke-arch in an extinguished condition, that allows them to be removed whenever desired. In the meantime the smoke and other gaseous products of combustion are free to escape through the annular space F into the perforated cylinder J, and thence out at the upper open end of the latter.

As the various wings or flanges G curve outwardly from a common vertical center coincident with the axis of the smoke-stack, it is evident the products of combustion have the above-described whirling motion imparted to them as soon as they ascend far enough within the chimney to enter the numerous spaces or channels between these curved wings. This result could not be obtained if the inner ends of the flanges were not in direct contact with each other, as the least separation of said ends would afford a common central opening communicating with all the spaces or channels between said flanges, and affording room for the products of combustion to "chamber" in, and thereby prevent their prompt lateral dispersion. Furthermore, spark-arresters composed of curved wings having their intervening channels in communication with a common central opening or chamber are admitted to be old, and therefore my claims are not to be construed as an attempt to cover such devices.

I claim as my invention—

1. A spark-arrester consisting of a series of curved wings or flanges, G, surmounted with a deflecting-plate, E, the inner ends of said flanges being united at or near the axis of the stack, so as to avoid a common central opening or chamber communicating with the channels between the flanges G, as herein described.

2. The combination, in a smoke-stack, of deflecting-plate E, perforated cylinder J, and a series of wings or flanges, G, which latter curve outwardly from a common center, as and for the purpose described.

3. The combination, in a smoke-stack, of the deflecting-plate E, provided with curved flanges or wings G, radiating from a common center, said plate being supported on the standards C, arranged as herein described.

4. The combination of shell A B, standards C, perforated cylinder J, and deflecting-plate E, which plate is provided with a series of curved wings or flanges, G, radiating from a common center, said perforated cylinder being secured in the mouth K of the stack, as herein described.

In testimony whereof I affix my signature in presence of two witnesses.

CASPER F. LOCHNER.

Witnesses:
JOHN SPEED,
J. WM. REINHARDT.